(12) United States Patent
Marchi et al.

(10) Patent No.: US 6,443,360 B1
(45) Date of Patent: Sep. 3, 2002

(54) METHOD AND DEVICE FOR FOCUSING AN ELECTRICAL SIGNAL REPRESENTATIVE OF AN OPTICAL CODE

(75) Inventors: Paolo Marchi, Imola; Marco Piva, Bologna, both of (IT)

(73) Assignee: Datalogic S.p.A., Bologna (IT)

( * ) Notice: Subject to any disclaimer, the term of this patent is extended or adjusted under 35 U.S.C. 154(b) by 0 days.

(21) Appl. No.: 09/825,342

(22) Filed: Apr. 4, 2001

(30) Foreign Application Priority Data

Dec. 21, 2000 (EP) .......................................... 00830837

(51) Int. Cl.[7] ................................................ G06K 7/10
(52) U.S. Cl. ............................. 235/462.25; 235/462.01
(58) Field of Search ....................... 235/462.01–462.02, 235/462.1–462.23, 462.24, 462.25, 462.27, 462.3, 472.01–472.3

(56) References Cited

U.S. PATENT DOCUMENTS

| | | | | |
|---|---|---|---|---|
| 4,320,486 A | * | 3/1982 | Cooley et al. ................ 369/14 |
| 5,016,250 A | * | 5/1991 | Rosen et al. .................... 372/5 |
| 5,272,519 A | * | 12/1993 | Naka et al. ..................... 358/11 |
| 5,381,107 A | * | 1/1995 | Hamamoto ................... 327/306 |
| 5,463,211 A | * | 10/1995 | Arends et al. ............... 235/462 |
| 5,671,744 A | * | 9/1997 | Abe et al. .............. 128/660.07 |
| 5,756,981 A | * | 5/1998 | Roustaei ...................... 235/462 |
| 5,857,037 A | | 1/1999 | Saotome et al. |
| 6,012,640 A | | 1/2000 | Liu |
| 6,047,894 A | | 4/2000 | Arends et al. |

FOREIGN PATENT DOCUMENTS

| | | | |
|---|---|---|---|
| JP | 357184381 A | * | 11/1982 |
| JP | 404124977 A | * | 4/1992 |

\* cited by examiner

*Primary Examiner*—Thien M. Le
(74) *Attorney, Agent, or Firm*—Nixon & Vanderhye P.C.

(57) ABSTRACT

There are described a method and a device for focusing an analogue electrical signal representative of an optical code, which selectively emphasize the highest frequencies of the electrical signal. The emphasis is performed with linear phase, so that the relative positions of the peaks and valleys of the focused analogue electrical signal substantially remain unchanged. The focusing can comprise low-pass, high-pass and band-pass filtering. The focusing can be variable, and in particular, automatically variable.

33 Claims, 9 Drawing Sheets

METHOD AND DEVICE FOR FOCUSING AN ELECTRICAL SIGNAL REPRESENTATIVE OF AN OPTICAL CODE

The present invention relates to a method and a device for focusing an electrical signal representative of an optical code. The invention may advantageously be used in an optical code reader.

In the present description and following claims, the expression "optical code" indicates any graphical representation having the function of storing a coded information. A particular example of optical code consists of linear or bidimensional codes, wherein the information is coded through suitable combinations of elements having predetermined shape, such as for example square, rectangular or hexagonal, dark-coloured (usually black) separated by light elements (spaces, usually white), such as bar codes, stacked codes and bidimensional codes in general, colour codes, etc. The expression "optical code" also comprises, more in general, other graphic shapes with the function of coding information, including light printed characters (letters, numbers, etc.) and particular patterns (such as for example, stamps, logos, signatures, fingerprints etc.). The expression "optical code" also comprises graphical representations detectable not only in the field of visible light, but also in the wavelength range comprised between infrared and ultraviolet.

By way of an example and for the purpose of making the following description clearer, explicit reference shall be made to a barcode reader; of course, a man skilled in the art will recognise that what said is applicable to different types of optical code readers, such as those indicated above.

Typically, an optical code reader, schematically illustrated in FIG. 1 and indicated with reference numeral 1, comprises an illumination unit 2, adapted to emit a luminous beam towards the support containing the optical code 3 to be read, and an opto-electric reception unit 4, adapted to collect the luminous signal diffused by the illuminated optical code. In particular, such luminous signal is collected, through an optical reception system, on suitable photo-receiving means, which convert the luminous signal into an electrical signal.

The following processing for reading the optical code can occur directly on the electrical signal, or before such successive processing, the electrical signal can be pre-processed by a pre-processing unit 5, which can comprise amplifying means and/or other means adapted to suitably change the electrical signal for the particular application. Then the electrical signal, pre-processed or not, is sent to a digitising and decoding unit 6, so as to extract its information content.

The digitising and decoding unit 6 includes a un digitiser and a decoder, not shown, which respectively have the purpose of digitising the received electrical signal, transforming it into a succession of digital pulses, and of extracting the coded information from the optical code, providing it in output in a form usable by processing devices connected downstream, or to displaying devices.

In a typical embodiment of a conventional reader, the illumination unit 2 comprises a luminous source, consisting of one or more LEDs and/or one or more diaphragms, and one or more focusing lenses, which focus the emitted luminous beam.

As an alternative, the luminous source can consist of one or more lasers, and the illumination unit 2 can comprise, besides the lens and/or the diaphragm, further scan means (for example, an oscillating mirror or a polygonal mirror rotor) for generating one or more scan lines of the luminous beam on the optical code.

Besides the photo-receiving means, the opto-electric reception unit 4 typically comprises one or more lenses and/or diaphragms adapted to collect the light beam diffused by the optical code and focus it.

In the following description, the expression "receiving optics" shall be used to indicate all of the lenses and/or diaphragms contained in the opto-electric reception unit 4 adapted to collect the light diffused by the optical code.

The photo-receiving means can consist of a linear or matrix sensor, for example a CCD (Charged Coupled Device) or a CMOS (Complementary Metal Oxide Semiconductor), or of a photodiode.

Reader 1 can be of the fixed or portable type, and it is associated with a depth of field that is definable as the range of optical code-reader distances in which the reader reads correctly.

In all of the above-mentioned types of readers, an analogue signal is obtained at the output of the photo-receiving means, which is an electrical signal reproducing the reflectance modulations of the elements forming the optical code along a scan line of the same code. In fact, the light with which the optical code is illuminated is absorbed by the bars and reflected by the spaces. Thus, the analogue signal has an alternate pattern, with relative maximums (called peaks in the following description) at the spaces, relative minimums (called valleys in the following description) at the bars, and leading and trailing fronts at the transitions between bars and spaces, and vice versa, as illustrated in FIG. 2.

In the following description, also the expression "negative peak" shall be used, where appropriate, to indicate a valley of the analogue signal, whereas a peak of the analogue signal may also be indicated with the expression "positive peak".

Moreover, the analogue signal comprises a frequency band containing all the information relating to the detected optical code. The frequency band can be very variable, since it depends on various factors among which the print resolution of the optical code, the reader-optical code distance, and the properties of the photo-receiving means. For example, for a high-depth of field CCD reader, the frequency band can be comprised between 100 Hz and 50 KHz.

To allow a correct reading of the optical code, the analogue signal in input to the digitising and decoding unit 6 must reproduce as accurately as possible the alternation of the code bars and spaces, that is, it must exhibit minimum alteration with respect to the ideal alternate pattern.

In fact, the alteration of the analogue signal can cause errors during the digitisation, thus impairing the successive decoding. In particular, the analogue signal alteration mainly concerns the following factors:
1) amplitude of the analogue signal and relevant dynamics
2) signal/noise ratio (SNR) associated to the same analogue signal.

With reference to item 1), the analogue signal amplitude can be too little to allow, during digitisation, the recognition of some elements of the optical code. Typically, a high resolution or a low contrast of the optical code can be the causes of an analogue signal in which peaks and valleys are not very marked.

With reference to item 2), noise can be of electronic nature, due to the components of the reader, and of ambient nature, due for example to fluctuations in the illumination of the optical code. Noise introduces high-frequency portions in the analogue signal, and during digitisation and decoding, this may cause peaks and/or valleys due to noise and not to the optical code to be recognised as elements of the optical code.

A parameter of the "good quality" of the analogue signal is its focusing. In the case of a barcode reader, "focusing" refers to the ratio between the peak-valley amplitudes of the analogue signal of narrow elements, and the peak-valley amplitudes of the analogue signal of wide elements of the barcode, where elements indicates both a bar and a space. To this purpose, reference shall be made to FIG. 2, showing the temporal pattern of an analogue signal relating to a fragment of barcode, wherein Vp1 indicates the peak value relating to a wide space, Vp2 indicates the valley value relating to a wide bar, Vp3 indicates the peak value relating to a narrow space, and Vp4 indicates the valley value relating to a narrow band. By indicating with Vppw the peak-valley amplitude relating to the wide elements of the barcode (Vp1–Vp2) and with Vppn the peak-valley amplitude relating to the narrow elements of the barcode (Vp3–Vp4), focusing F is defined by the non-dimensional quantity:

$$F = \frac{V_{ppn}}{V_{ppw}} \quad (1)$$

In general, the value of F (always $\leq 1$) is variable into the barcode.

In a laser light reader (or laser scanner) with oscillating mirror or with polygonal mirror rotor), the analogue signal focusing is determined by the size and shape of the spot that scans the same optical code (besides, of course, the print resolution). The spot size depends on the reading distance and on the optics used for generating emission laser beam.

In a linear CCD reader without moving mechanical parts, the focusing is determined by the receiving optics (lens and diaphragm), by the optical code distance and by its print resolution.

Also in an optical pen (contact reader with manual scan) or in a slot reader of the fixed type, with manual scan and very limited depth of field, the focusing is determined by the optical code distance, by the print resolution and by the receiving optics.

From experimental measures, it is possible to define an analogue signal having $F \cong 0.7$ as correctly focused. Signals with $F \leq 0.5$ usually generate a digitised signal with some element having incorrect size and/or position; with values of $F \leq 0.35$ it is already possible to have the loss of some element in the digitised signal. In fact, the analogue signal with low focusing typically exhibits a strongly altered pattern, since the peaks identifying the narrowest spaces are lowered, and the valleys identifying the narrowest bars of the code are lifted. During digitisation, this can cause the wrong evaluation of elements, or even the loss of some narrow element and, in the successive decoding step, a wrong calculation of bars and spaces.

An excessive focusing ($F \geq 0.85$) can equally cause problems, since print and support imperfections and defects are too emphasised (probable addition of spurious elements on the digitised signal).

Known solutions for obtaining a good focusing of the analogue signal provide for acting on the illumination and/or receiving optics, that is, varying the focusing lens position (for example, with an auto-focus system).

However, said solutions imply an increase of the complexity of the optics, the use of moving mechanical parts, thus causing an increase of the costs of readers and a lower reliability of the same.

Other solutions are known, that improve the focusing of the analogue signal present at the digitiser input without acting on the optics.

Such solutions amplify the portions of analogue signal having reduced amplitude, but they introduce distortions in the amplified analogue signal.

In the following description, the expression "analogue signal distortion" indicates the shift introduced on the relative peak and valley positions with respect to their original relative position in the initial analogue signal, that is, that extracted from the photo-receiving means.

Thus, in conclusion, in known solutions, the increase of the focusing of the analogue signal is "paid" with the introduction of an error in the position of peaks and valleys of the focused analogue signal that reflects on the digitised signal and thus, on the decoding result.

Thus, purpose of the invention is that of improving the focusing of the analogue signal present at the output of the opto-electric reception unit 4 of readers of any type, limiting the additional distortion in the analogue signal.

In particular, the expression "improving the focusing" indicates both increasing the focusing value, and decreasing such value so as to obtain an optimum focusing value.

In fact, as already said, a very high focusing of the analogue signal (typically F>0.85) can cause decoding errors; in such specific case, the improvement object of the present invention is directed at decreasing the focusing value.

A further purpose of the invention is that of improving the analogue signal focusing maintaining a high signal/noise ratio.

Another purpose of the invention is that of increasing the depth of field of the reader by acting only electronically, but with a similar effect to that obtainable through the mechanical adjustment of the illumination and/or receiving optics.

In the following description and claims, the expression "analogue signal focusing" indicates the operation of improving the analogue signal focusing, defined according to (1). Moreover, the term "focusing" shall be also used for indicating the value defined by (1).

According to the present invention, a method for focusing an analogue electrical signal ($s_i$; $s_i(n)$) is realised, such analogue electrical signal being representative of an optical code and exhibiting frequency band and amplitudes correlated to the information content of the optical code, characterised in that it comprises the steps of selectively emphasizing with linear phase portions of said analogue electrical signal ($s_i$; $s_i(n)$) having predetermined features, and of generating a focused analogue electrical signal ($s_o$; $s_o(n)$)

According to this solution, the focusing is carried out by selectively emphasizing with linear phase the analogue signal high-frequency portions.

According to another solution of the invention, the focusing is carried out by selectively emphasizing with linear phase the analogue signal high-frequency portions obtained by filtering out low-frequency portions, and adding emphasized high-frequency portions to the suitably delayed analogue signal.

According to another solution, before being respectively emphasized and delayed, the analogue signal is filtered with linear phase so as to let substantially all the frequencies of the frequency band pass.

According to a further solution of the invention, for maintaining the focusing substantially constant as the optical code-reader distance changes, the emphasizing of the analogue signal high-frequency portions may be controlled. According to a variant of such solutions, emphasizing is manually controllable. According to another variant, emphasis is automatically controllable through a multiple selection of a parameter or of an emphasizing function. According to another variant, emphasis is automatically controllable through a system that measures the focusing value of the analogue signal and changes the parameter or the emphasizing function on the basis of the measured focusing value.

Moreover, the invention relates to a device for focusing an analogue electrical signal ($s_i$; $s_i(n)$) representative of an optical code and exhibiting frequency band and amplitudes correlated to the information content of the optical code, characterised in that it comprises linear phase emphasizing means (7; 8; 12; 12') which selectively emphasize portions of said analogue electrical signal having predetermined features ($s_i$; $s_i(n)$) and generate a focused analogue electrical signal ($s_o$; $s_o(n)$)

According to this solution, the focusing unit comprises a linear phase filter which provides, in output, an analogue signal whose high-frequency portions are emphasized.

According to another solution, the focusing unit comprises a linear phase filter of the high-pass type and an analogue multiplier that provide an emphasized high-frequency analogue signal in output, having a fixed group delay with respect to the input analogue signal; moreover, the focusing unit comprises a delay line that delays the analogue signal, introducing a delay equal to the group delay of the emphasized high-frequency analogue signal, and a node that sums the emphasized high-frequency analogue signal to the delayed and the delayed analogue signal.

According to another solution, the focusing unit comprises a low-pass linear phase filter upstream of the high-pass filter and of the delay line.

According to a solution of the invention, the analogue multiplier allows adjusting the focusing in function of the distance between the optical code and the reader, and of other variable conditions.

According to yet another solution, the adjustment is performed manually. According to another solution, the adjustment automatically occurs through a system for measuring the focusing value of the analogue signal or of the focused analogue signal, with a feedback or direct action control.

Further features of the invention will appear more clearly from the description of some preferred embodiments, provided by way of a non-limiting example and illustrated in the attached drawings. In such drawings.

The present invention is based on the perception that a method and device for focusing an analogue signal representative of an optical code, without introducing—or in any case minimising the introduction of distortion in the analogue signal—must satisfy the following conditions:

a) the transfer function module must be that desired in the frequency band of interest;

b) the transfer function phase must be proportional to the frequency (linear phase).

The inventors have experimented that if both these conditions are satisfied, the device output emphasizes the analogue input signal by the desired quantities, apart from a delay $\tau_g$ called group delay.

The inventors have also perceived that for the focusing method and device, object of the invention, the compliance with condition b) is much more important than that with condition a), since variations in the obtained emphasizing with respect to that desired are less critical than phase variations.

According to the invention, the analogue signal extracted from the photo-receiving means is then processed by a focusing unit having linear phase.

The focusing unit consists of circuits that emphasize the peak-valley amplitude of the analogue signal portions having higher frequency in the band of frequencies of the analogue signal (that is, the analogue signal portions relating to the narrow elements of the optical code), and which introduce a constant group delay in the entire band of frequencies of the analogue signal.

In particular, such emphasizing operation consists in changing the peak-valley amplitude of the analogue signal. The change consists either in amplifying the peak-valley amplitudes of the analogue, or in attenuating them, according to the operating condition.

In the following description and attached claims, the expression "analogue signal emphasizing" thus indicates not only the operation and the result of amplifying the peak-valley amplitudes of the analogue signal, but also the operation and the result of attenuating such amplitudes.

Figure 1:
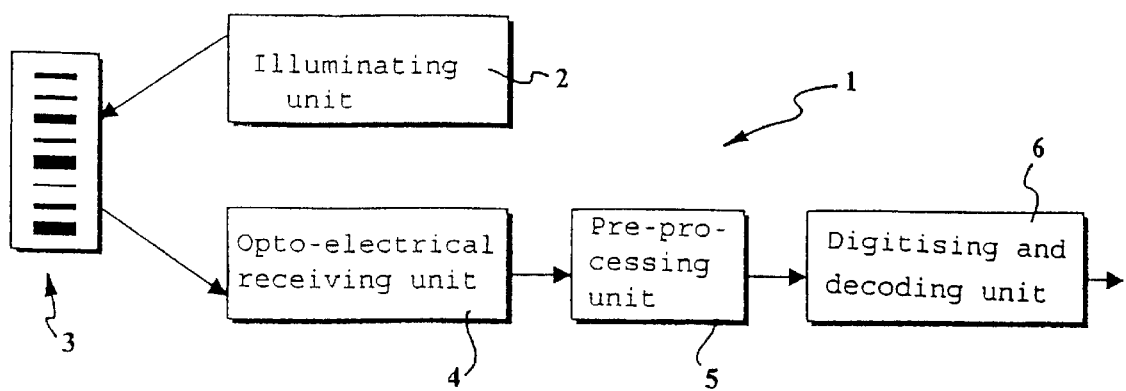
FIG. 1 shows a block diagram of a know n optical code reader.
Figure 2:
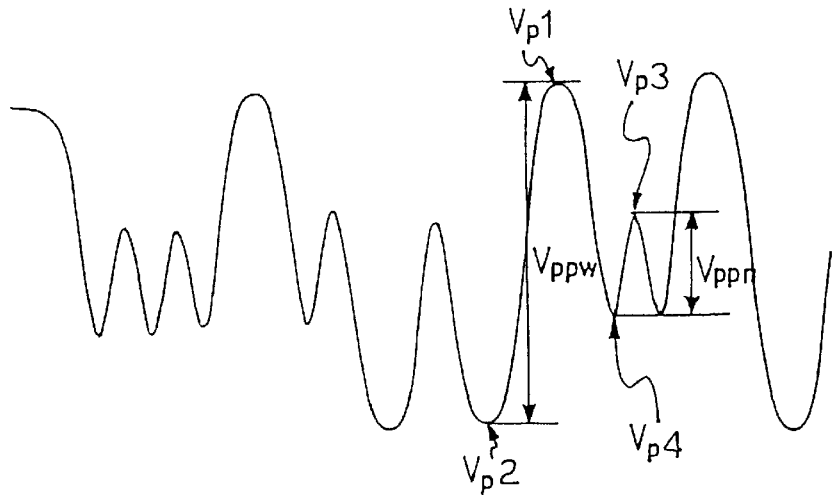
FIG. 2 shows the temporal pattern of an analogue signal at the output of the opto-electric reception unit 4 of the reader of FIG. 1.
Figure 4D:
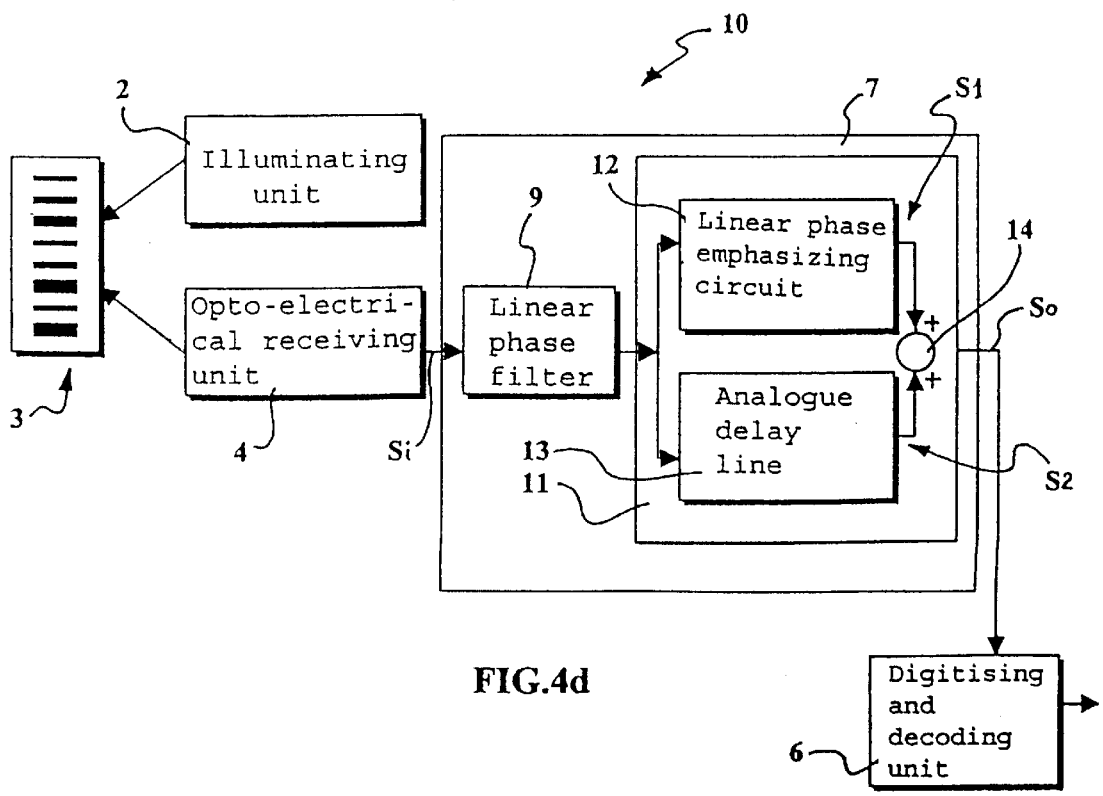
FIG. 4d shows a block diagram of a third embodiment of the invention.
Figure 4A:
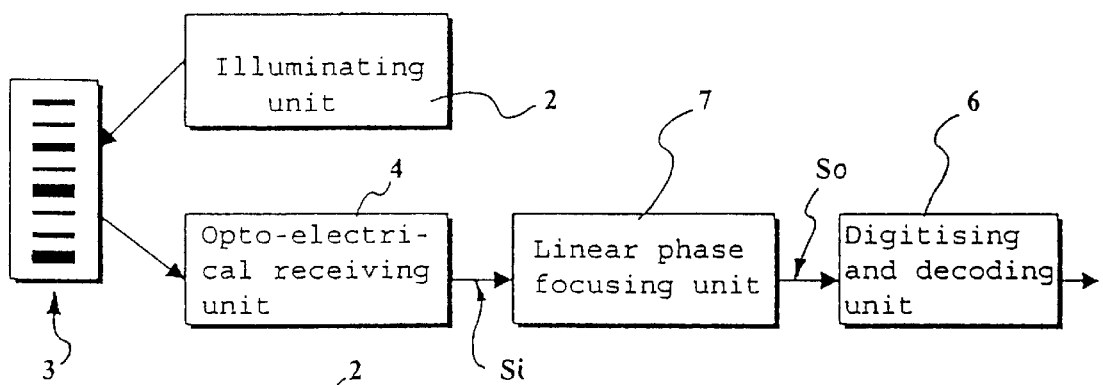
FIG. 4a shows a block diagram of the invention.

The general block diagram of the device according to the invention is shown in FIG. 4a, wherein parts similar to the diagram of FIG. 1 are indicated with the same reference numeral.

In detail, the optical code reader 10 shown in FIG. 4a comprises an illumination unit 2, analogous to that of FIG. 1; an opto-electric reception unit 4, analogous to that of FIG. 1; a linear phase focusing unit 7 and a digitising and decoding unit 6, analogous to that of FIG. 1.

The linear phase focusing unit 7 improves the focusing of the analogue signal through the emphasis on the portions with the highest frequencies in the frequency band of the analogue signal $s_i$. In particular, the focusing is increased or decreased respectively through amplification or attenuation of the peak-valley amplitudes corresponding to the narrowest elements of the optical code.

Moreover, the linear phase focusing unit 7 solves the problem of the relative shift of the analogue signal peaks and valleys. In fact, the phase linearity implies that the output focused analogue signal $s_o$ exhibits a constant group delay in all the frequency band of the analogue signal, that is to say, all portions of the analogue signal at different frequency are equally delayed, thus the relative position of peaks and valleyss substantially remains unchanged.

The focused analogue signal $s_o$ in output from the linear phase focusing unit 7 thus exhibits an improvement of the focusing value and an extremely limited additional distortion.

According to a variant, the digitising and decoding unit 6 is "remote", that is to say, through a cable or a wireless connection, the analogue signal in output from the linear phase focusing unit 7 can be sent to a processing unit far from the reader, unit that then communicates to the reader and/or to other display devices the result of the optical code reading.

Figure 4B:
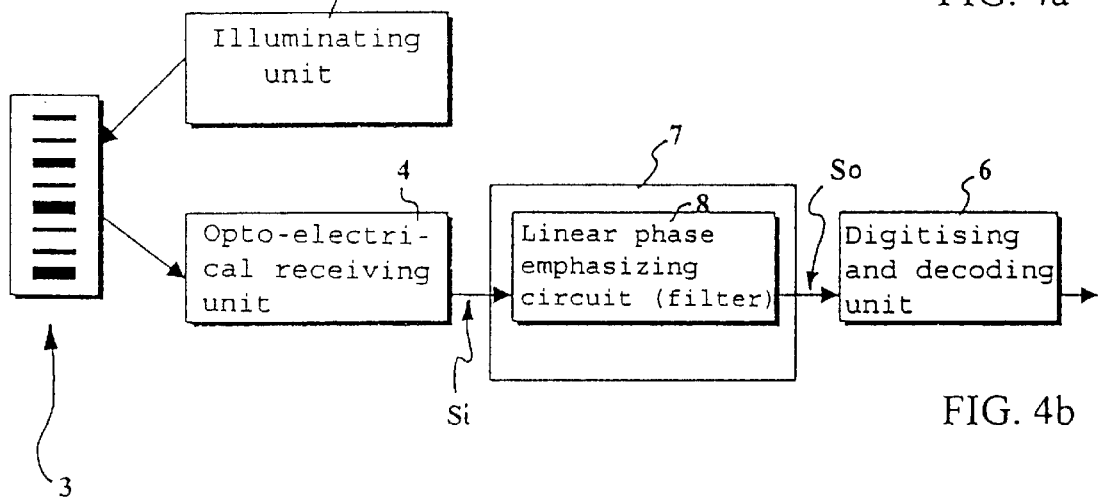
FIG. 4b shows a block diagram of a first embodiment of the invention.

According to a first embodiment of the invention, shown in FIG. 4b, the linear phase focusing unit 7 comprises a linear phase emphasizing circuit 8. According to a preferred embodiment, the linear phase emphasizing circuit 8 is also a filter, providing in output a focused analogue signal $s_o$ and having the following features: it exhibits a suitable module, linear phase, and is well shaped on the band of frequencies of the analogue signal $s_i$ provided by the opto-electric reception unit 4.

In particular, the emphasizing linear phase filter 8 has a module pattern that introduces in the analogue signal an emphasis concentrated at the high frequencies.

Moreover, the filtering operation can occur before, after or concurrently with the emphasizing operation.

Figure 3A:
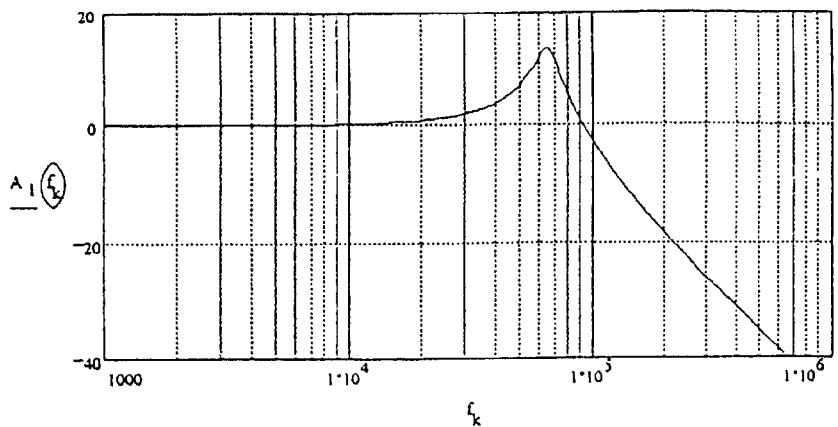
FIGS. 3a, 3b and 3c show Bode diagrams relating to an embodiment of the invention.
Figure 3B:
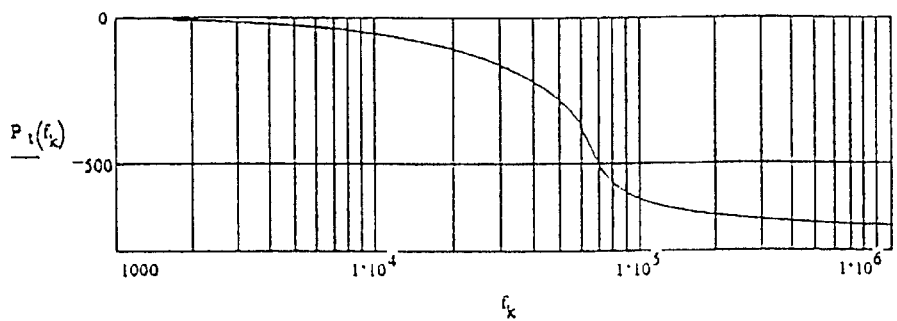
Figure 3C:
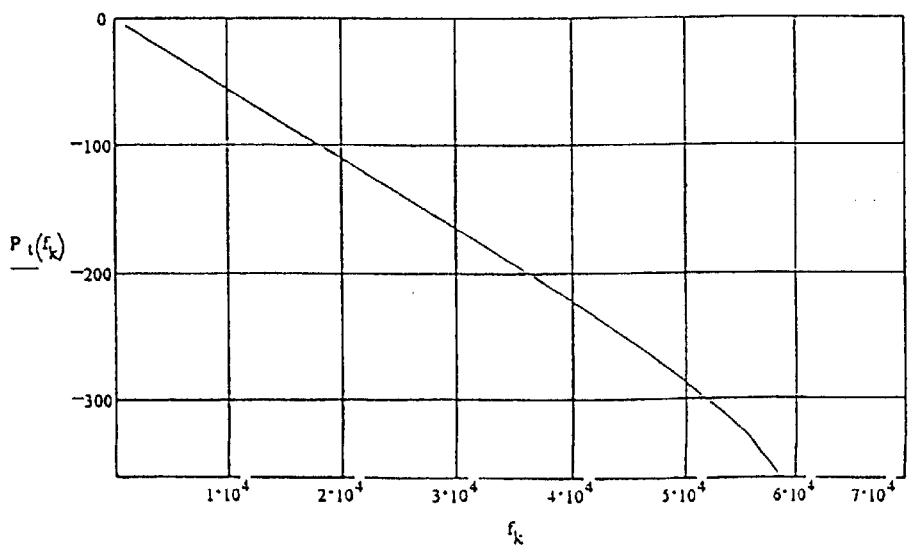

FIGS. 3a, 3b and 3c show the Bode diagrams relating to an example of embodiment of the low-pass emphasizing filter 8. Such diagrams show the transfer function of the linear phase emphasizing filter 8 and, in particular, the module and the phase in function of the frequency. As it can be seen in FIG. 3a, the linear phase emphasizing filter 8 has a cut-off frequency of about 100 KHz, and it amplifies the relative peak-valley amplitudes at the highest frequencies of the analogue signal $s_i$, yet lower than the cut-off frequency.

FIG. 3c shows the same graph of FIG. $3_b$, but in a linear scale, to highlight that the resulting phase is linear.

In an exemplifying embodiment relating to a CCD reader, the linear phase emphasizing filter 8 is of the eighth order, and consists of four low-pass stages in cascade. A filter of this type is suitable for an analogue signal with a band of frequencies comprised between 100 Hz and 50KHz.

The condition of "shape adjustment" of the linear phase emphasizing filter 8 to the analogue signal is advantageously set so as to optimise the signal/noise ratio at the filter output, preventing the degradation of the output analogue signal due to noise from making the focusing improvement obtained with the introduced emphasis unusable.

According to a variant, the linear phase emphasizing filter 8 is of the band-pass type, thus filtering also the portions of a frequency below a suitable threshold. This can be advantageous for reducing, for example, the effects of ambient light and/or the effect of an uneven illumination of the code.

According to another variant, the linear phase emphasizing filter 8 is of the high-pass type, making the portions of the analogue signal $s_i$ having a higher frequency than a suitable frequency pass.

In all the described cases, the linear phase emphasizing filter 8 lets substantially all the frequencies of the frequency band containing the useful optical code information pass.

Moreover, the linear phase emphasizing filter 8 is such that the output analogue signal $s_o$ is emphasized in the high-frequency portions of the band, and has an extremely limited distortion.

In fact, the linear phase emphasizing filter 8 introduces a constant group delay on the analogue signal, leaving the relative positions of peaks and valleys substantially unchanged.

Figure 4C:
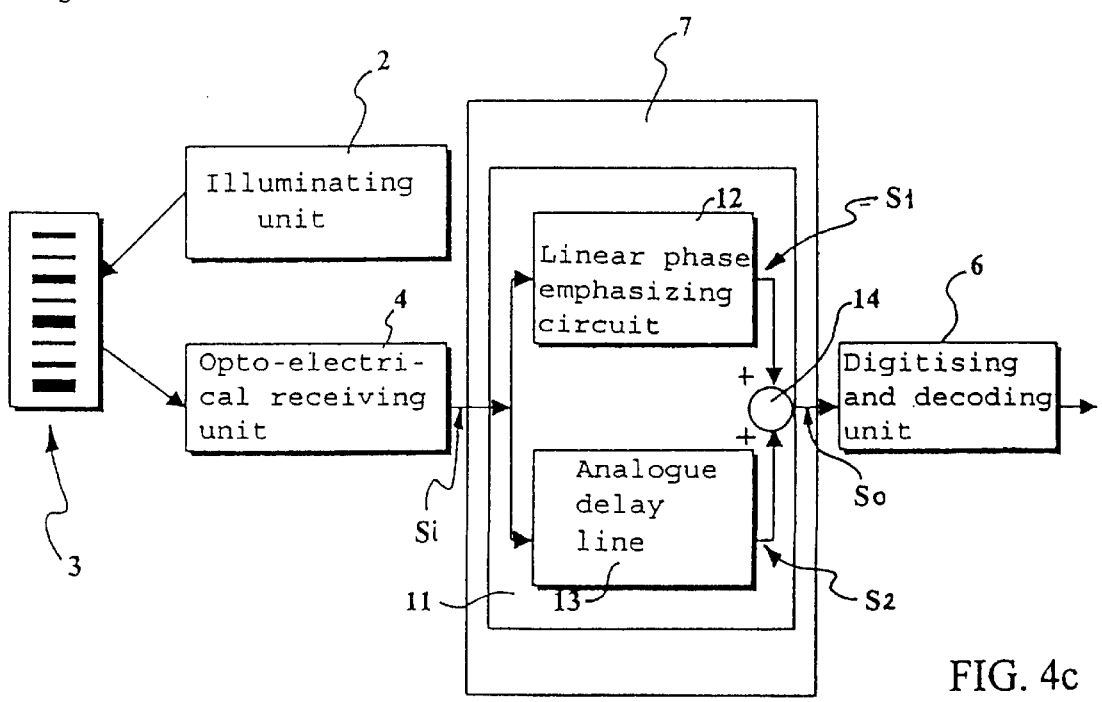
FIG. 4c shows a block diagram of a second embodiment of the invention.

According to a second embodiment of the invention, shown in FIG. 4c, the linear phase focusing unit 7 consists of a block 11 comprising a linear phase emphasizing circuit 12, an analogue delay line 13 and a node 14 that performs the logical sum function. Both the linear phase emphasizing circuit 12 and the analogue delay line 13 receive in input the analogue signal $s_i$ and provide in output the respective analogue signals s1 and s2 provided to node 14, which sums them and provides a focused analogue signal $s_o$ to the digitising and decoding unit 6.

In detail, the linear phase emphasizing circuit 12 is realised as high-pass filter with limited gain at high frequencies and linear phase. It only lets the portions of analogue signal $s_i$ having a higher frequency than that of cut-off pass, emphasizes the peak-valley amplitude of these portions and exhibits a constant group delay in the entire frequency band. As an example of embodiment, the high-pass filter has a cut-off frequency equal to 30 KHz. In output from the linear phase emphasizing circuit 12, there is an emphasized analogue signal s1 containing only the high-frequency portions of the frequency band of the signal, whose peak-valley amplitudes are emphasized with respect to the corresponding ones of the analogue signal $s_i$ in output from the on to-electric reception unit 4.

On the other hand, the analogue delay line 13 suitably delays the analogue signal $s_i$ giving in output the delayed signal s2. In particular, the analogue delay line 13 introduces on the analogue signal $s_i$ the same group delay introduced by the linear phase emphasizing circuit 12.

The emphasized analogue signal s1 is then summed to the delayed analogue signal s2. Actually, node 14 subtracts signal s1 from signal s2 because s1 exhibits a 180° phase displacement and thus, it has an opposite sign with respect to the analogue signal $s_i$. Thus, the logical sum operation is physically realised as difference.

The focused analogue signal $s_o$ present at the output of node 14 is relatively emphasized at high-frequency portions, and simply delayed. As a consequence, the relative position of peaks and valleys remains unchanged.

This second embodiment is particularly advantageous in the applications wherein the analogue signal $s_i$ is not very noisy.

If signal $s_i$ contains noise, it is preferable to insert, upstream of block 11, a linear phase filter 9 of the low-pass type.

Thus, according to a third embodiment of the invention, shown in 4d, the linear phase focusing unit 7 comprises a linear phase low-pass filter 9 and a block 11 similar to that described before.

Figure 5:
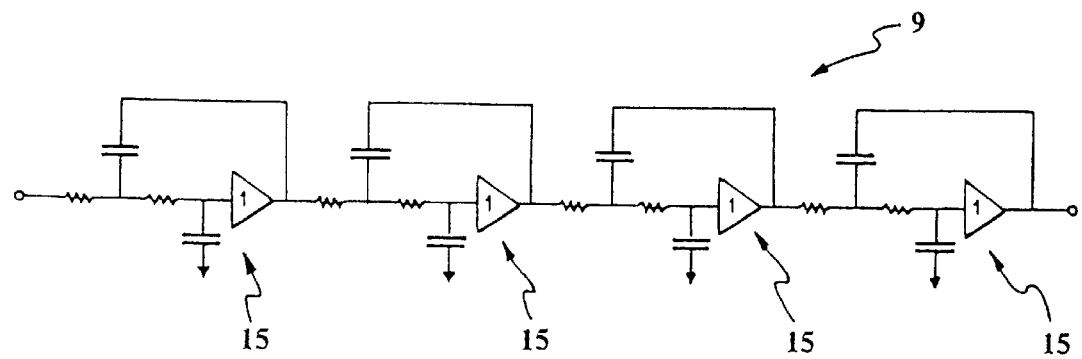
FIG. 5 shows a circuit diagram of a block of FIG. 4d.
Figure 6:
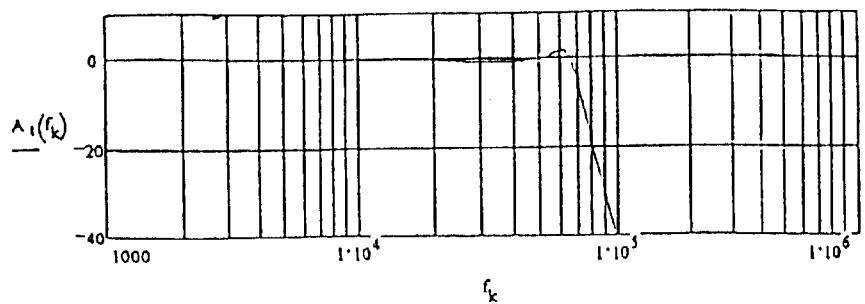
FIG. 6 shows a Bode diagram relating to a block of FIG. 4d.

In an exemplifying embodiment, shown in FIG. 5, the linear phase low-pass filter 9 is of the eighth order, and consists of four low-pass stages 15 in cascade, and has a Bode diagram relating to the transfer function module shown in FIG. 6. According to this embodiment, the linear phase low-pass filter 9 does not introduce emphasis on the analogue signal $s_i$, but cuts the highest frequencies of the signal that may be due to noise. The transfer function phase pattern is totally similar to that shown in FIG. 3b and in FIG. 3c, which highlights the linearity of the resulting phase.

According to a variant, the linear phase filter 9 can introduce a pre-emphasis that is either distributed on the entire frequency band or concentrated only on the highest frequencies, before the cut-off frequency. In this last case, the linear phase filter 9 co-operates with the linear phase emphasizing circuit 12 for emphasizing the high-frequency peak-valley amplitudes of the analogue signal, thus improving at the same time the signal/noise ratio.

This solution can be useful for very weak analogue signals for which it is convenient to operate a pre-emphasis and then the actual emphasis.

In all the described solutions, the linear phase filter 9 produces a filtered analogue signal in output that then respectively enters in the linear phase emphasizing circuit 12 and in the analogue delay line 13, according to the modes described above.

Figure 7:
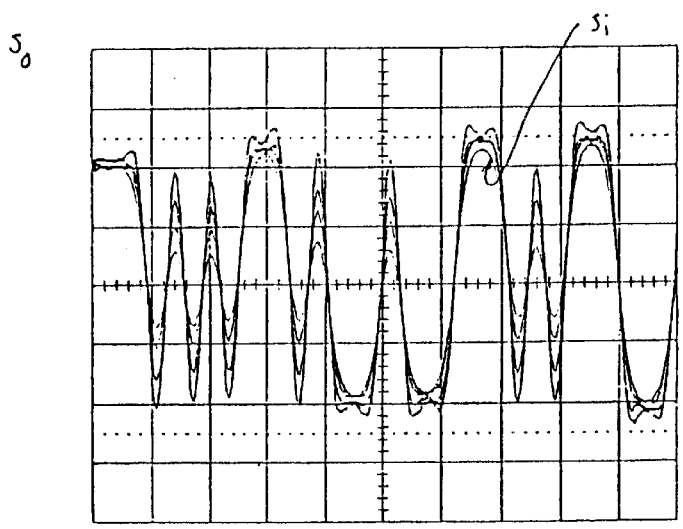
FIG. 7 shows different temporal patterns of the analogue signal, obtained for different focusing values.

FIG. 7 shows the pattern of the focused analogue signal $s_o$ for different focusing values; in particular, the patterns of the analogue signal $s_i$ (having focusing F=0.27) and of different focused analogue signals $s_o$, characterised by increasing focusing up to the value of 0.8, are superimposed in the FIG. As it can be noted, as the focusing increases, the peak-valley amplitude associated to narrow elements increases, maintaining the position of peaks and valleys unchanged, and the focused analogue signal $s_o$ maintains the perfect symmetry also when the focusing increase is considerable.

Figure 8:
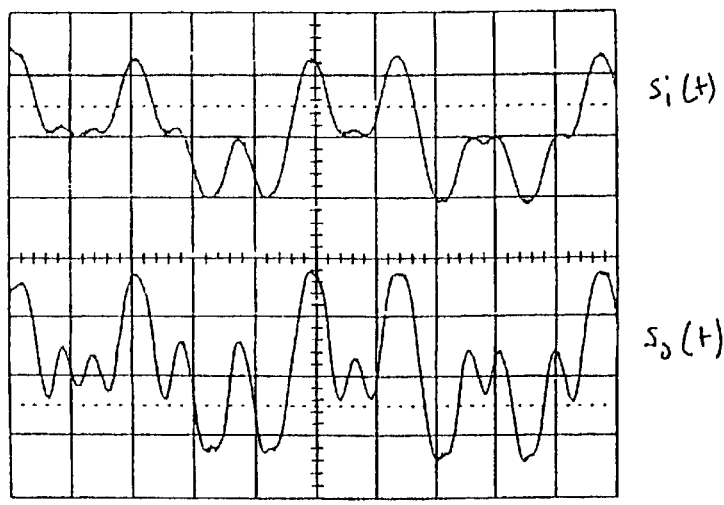
FIG. 8 shows the pattern of an analogue signal and of the respective analogue signal focused with the method according to the invention.

FIG. 8 shows the effect obtainable for an analogue signal $s_i$ with a very low focusing value. In this case, a significant improvement of the focusing of the analogue signal $s_i$, has been obtained, with almost null distortion.

To vary the depth of field of the reader, the inventors have perceived that, since the equivalent transfer function of the opto-electric reception unit 4 depends on the reader-optical code distance, it can be advantageous to vary the transfer function of the linear phase emphasizing circuit 12 so that the equivalent transfer function of the linear phase focusing unit 7 (FIG. 4a) exhibits a Bode diagram of the module that is as complementary as possible to that of the opto-electric reception unit 4 in the significant part of the spectrum relating to the analogue signal $s_i$, maintaining the phase linearity.

According to a preferred solution of the invention, there is provided the possibility of changing the gain of the linear phase focusing unit 7.

Figure 9:
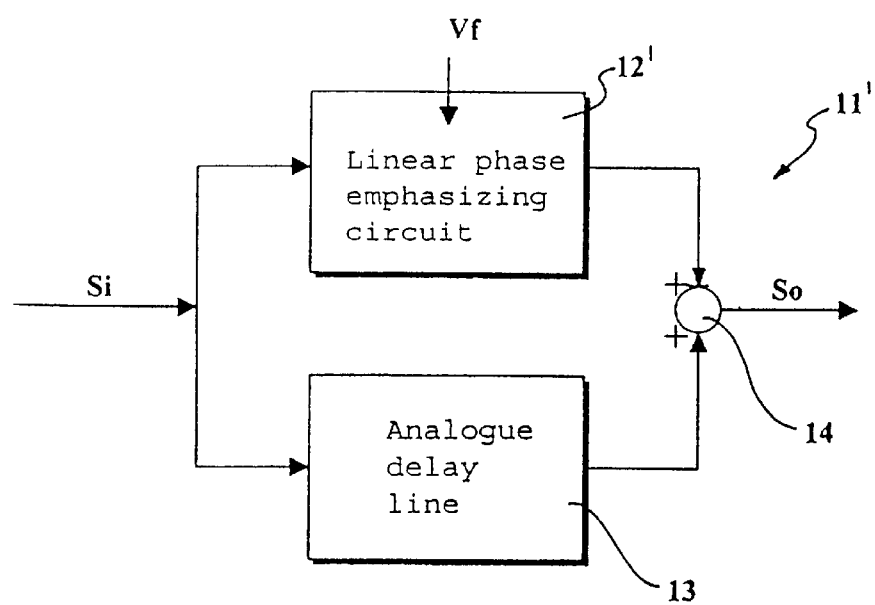
FIG. 9 shows a block diagram of a further embodiment of the invention.

FIG. 9 shows a block diagram 11' representing an embodiment of the invention wherein an emphasizing parameter Vf is provided to the linear phase emphasizing circuit 12', which changes the gain of the same linear phase emphasizing circuit 12'.

By varying the emphasizing parameter Vf, the emphasis on signal s1 is changed, and thus, the focusing of the output analogue signal $s_o$ is changed in a very similar way to what would be obtained by adjusting the illumination and/or receiving optics. In particular, it is possible to obtain both a focusing increase (for positive values of Vf) and a focusing reduction (for negative values of Vf).

In this way, the emphasis on signal s1 is changed for obtaining the best focusing value for the specific application.

In fact, it can happen that for a particular operating condition (for example, a particular arrangement of the optics) the analogue signal focusing is very high, thus implying the risk of adding spurious elements in the digitised signal (for example, due to print defects of the code); in this case, it can be advantageous to reduce the focusing through the attenuation of higher frequency portions.

Figure 10:
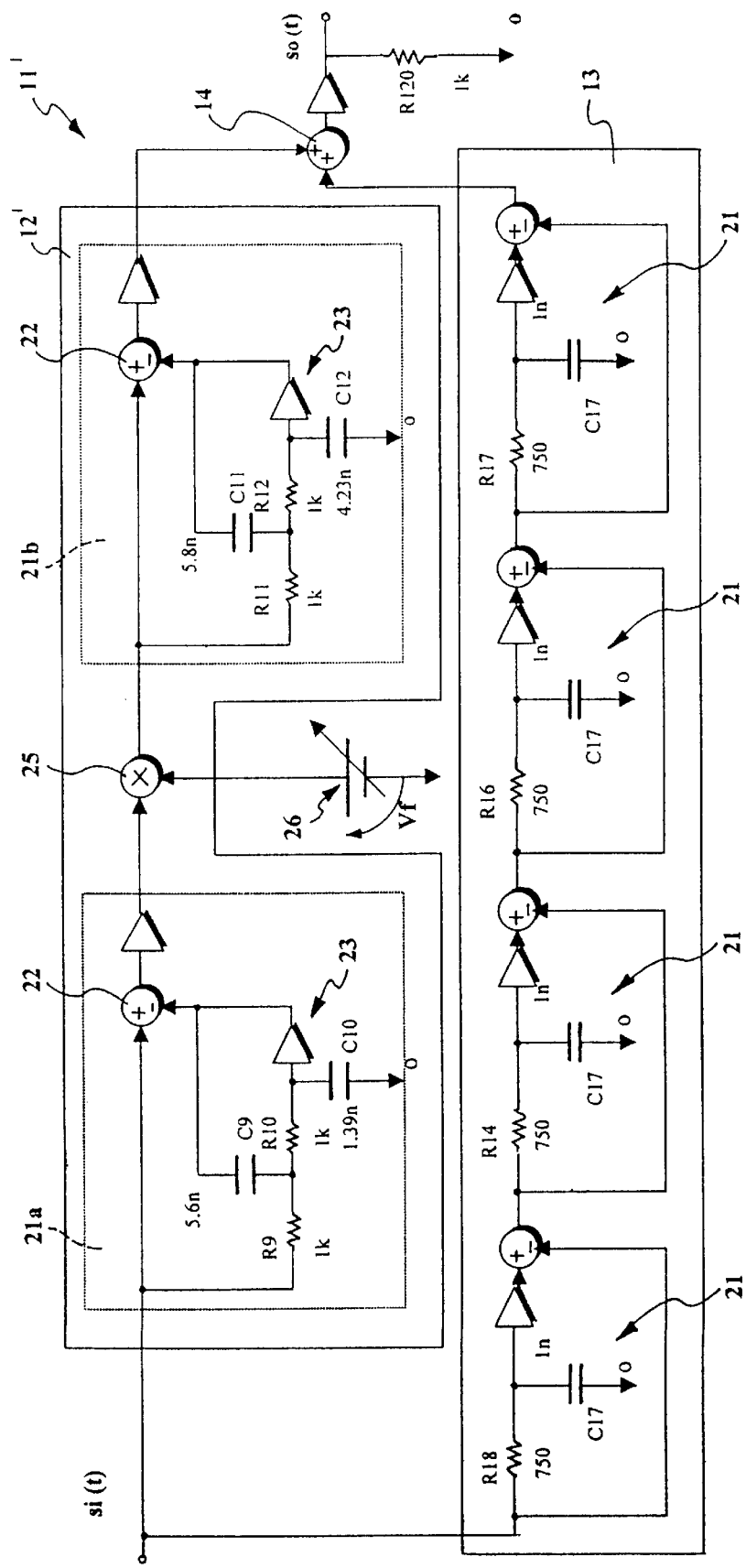
FIG. 10 shows a circuit diagram of the block diagram of FIG. 9.

An embodiment of block 11' of FIG. 9 for varying the depth of field of a CCD reader is shown in FIG. 10, wherein the linear phase emphasizing circuit 121 consists of two linear phase high-pass blocks 21a, 21b of the first order in cascade, and of an analogue multiplier 25, and the analogue delay line 13 consists of four all-pass blocks 21 in cascade, all having a unitary module Bode diagram, and having linear global phase. High-pass blocks 21a, 21b are both realised through a circuit that performs the difference (through a subtracting node 22) between the input signal and the output of a low-pass circuit 23 of the second order, thus optimising the signal/noise ratio. Between the first and the second high-pass block 21a, 21b there is present the analogue multiplier 25 having a first input receiving the output signal of the first high-pass block 21a, a second input receiving the emphasizing parameter represented by the voltage Vf, and an output connected to the input of the second high-pass block 21b. The analogue multiplier 25 is of the high-precision type, and operates as amplifier having voltage-controlled gain.

The emphasizing voltage Vf is generated by a direct voltage generator 26, manually or automatically controllable, as described more in detail in the following description.

According to a variant, the emphasizing voltage Vf is a suitable function of the frequency of the analogue signal in output from the high-pass block 21a. In this way, the emphasizing level can be differentiated for different frequencies of the signal.

The solution described with reference to FIGS. 9 and 10 is applicable both in the absence and in the presence of the linear phase filter 9 upstream of blocks 12' and 13.

Figure 11:
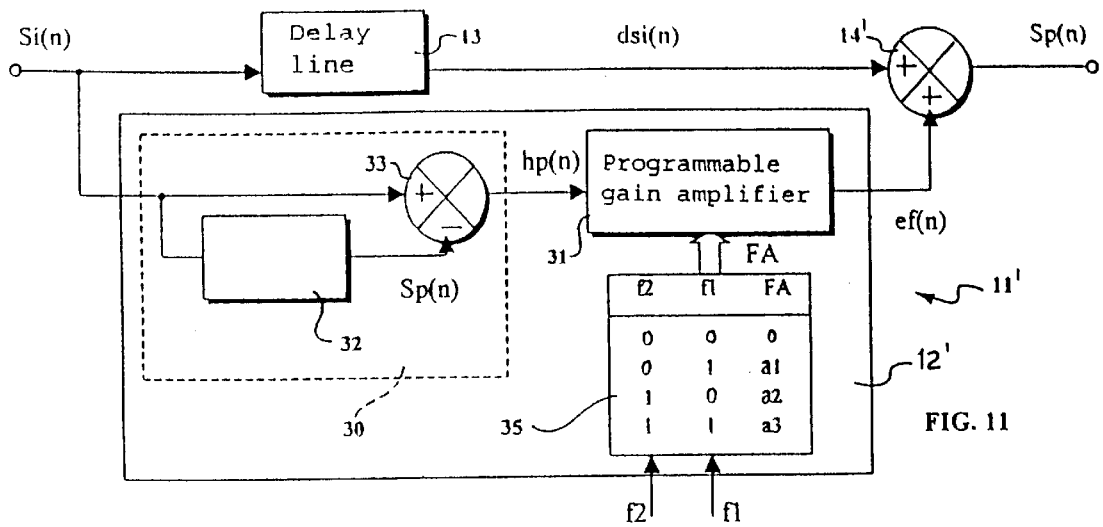
FIG. 11 shows a block diagram of a further embodiment of the invention.

An embodiment of block 11' of FIG. 9 for improving the focusing and varying the depth of field of a CMOS reader is shown in FIG. 11. In this case, the analogue signal in output from the opto-electric reception unit 4 is first sampled, thus obtaining an analogue signal indicated with $s_i(n)$, which we define as time-discrete analogue signal.

In FIG. 11, the linear phase emphasizing circuit 12' consists of a linear phase high-pass filter 30 of the fourth order, and of a programmable gain amplifier 31, and the analogue delay line 13 exhibits the same group delay as the high-pass filter 30. The programmable gain amplifier 31 is arranged downstream of the high-pass filter 30, before node 14' which performs the logical sum function. In detail, the high-pass filter 30 is realised through a low-pass filter 32 and a subtracting node 33; the low-pass filter 32 receives in input the time-discrete analogue signal si(n) and provides in output a time-discrete analogue signal sp(n); the subtracting node 33 receives the time-discrete analogue signal sp(n) and the time-discrete analogue signal si(n) and provides in output a time-discrete analogue signal hp(n) defined by:

$$hp(n)=si\ (n)-sp(n)$$

The programmable gain amplifier 31 is of the step type, and exhibits a control input receiving an emphasizing parameter FA from a memory table. The memory table 35 exhibits two inputs receiving two digital signals f1 and f2 (automatically or manually generated, as described hereinafter) and it selects the emphasizing parameter FA on the basis of the digital signals.

According to a variant, the memory table 35 can have m inputs and receive m digital signals so as to provide $2^m$ emphasizing parameters FA.

The emphasizing parameter FA can be a numerical value or a suitable function of the frequency of the time-discrete analogue signal hp(n). In this latter case, the emphasizing level can be differentiated for different frequencies.

The blocks of FIG. 11 are preferably realised through a switched capacitors method, using the time-discrete equations described hereinafter.

The high-pass filter 30 is realised as analogue FIR (Finite Impulse Response) filter of order N, which can be expressed with equation $$\mathrm{hp}(n) = \sum_{i=0}^{N-1} c_i si(n-i)$$

wherein $c_i$ are fixed coefficients (filter tap weights).

Figure 12:
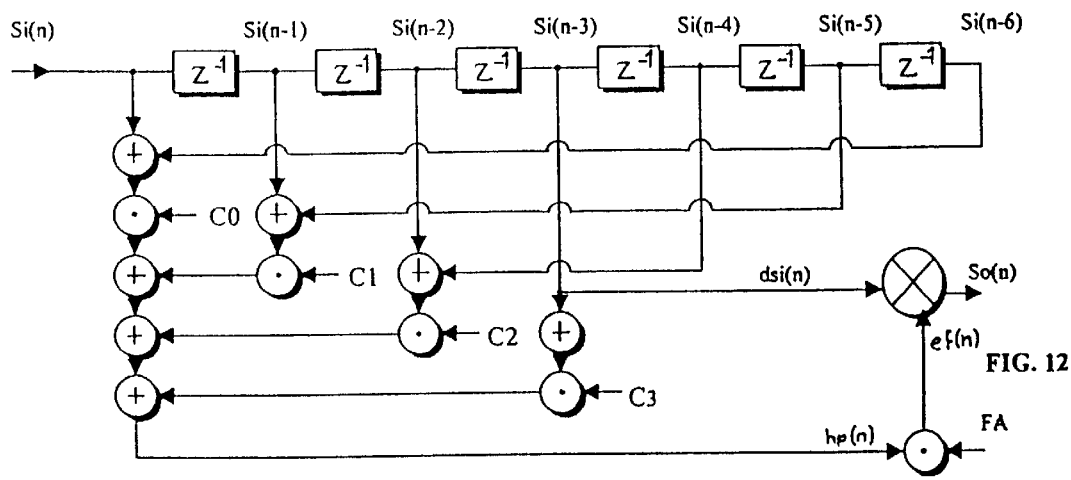
FIG. 12 shows a more detailed diagram of the block diagram of FIG. 11.

For the FIR filter to be linear-phased, it exhibits a symmetrical impulse response, and coefficients $c_i$ are symmetrically arranged with respect to the intermediate tap (N−1)/2. In the particular case of a FIR filter of order N=7 (as shown in FIG. 12), a group delay (N−1)/2=3 is obtained.

The delay line 13 is defined by the time-discrete equation:

$$dsi(n) = s_i(n - \mathrm{DEL})$$

with $$\mathrm{DEL} = (N-1)/2$$

that is, equal to the group delay of the high-pass filter 30. In the above case of high-pass filter 30 of order N=7, we have:

$$dsi(n) = si(n-3)$$

The programmable gain amplifier 31 is defined by the following time-discrete equation:

$$ef(n) = FA\ hp(n)$$

Also in this embodiment, node 14' carries out the logical sum function, but it physically performs the difference between the delayed time-discrete analogue signal $ds_i(n)$ and the emphasized time-discrete analogue signal ef(n), since the latter has a 180° phase displacement with respect to the time-discrete analogue signal $s_i(n)$.

Figure 13:
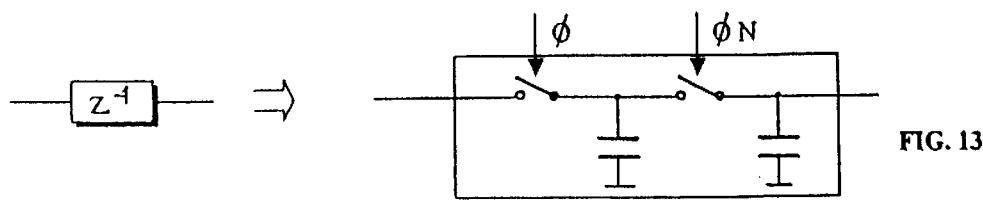
FIGS. 13 and 14 show a circuit diagram of some blocks of FIG. 12.

Overall, the focusing device 11' can be implemented by the time-discrete circuit shown in FIG. 12, wherein blocks $z^{-1}$ represent unitary delay blocks. In case of switched capacitor technology, such blocks are realised as shown in FIGS. 13 and 14, wherein Φ and ΦN are two square wave clock signals, with a 180° phase displacement.

Figure 14:
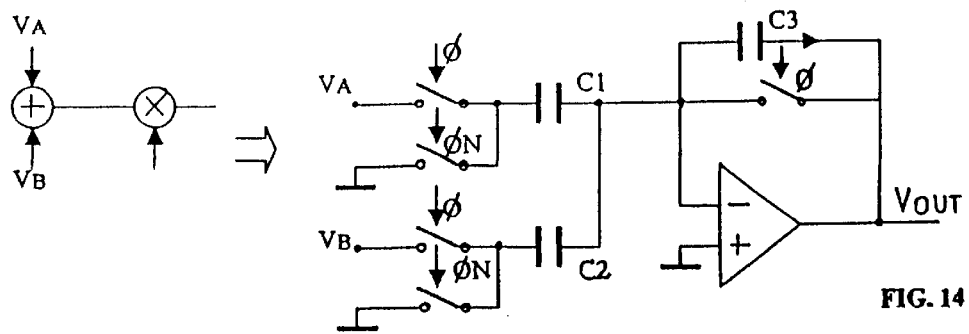

In particular, with reference to FIG. 14, we have that:

$$V_{OUT} = V_A \frac{C_1}{C_3} + V_B \frac{C_2}{C_3}$$

If C1=C2 e C1/C3=K, we have that:

$$V_{OUT} = K(V_A + V_B)$$

If a linear phase filter 9 is present upstream of blocks 12' and 13, such filter operates in time-discrete mode.

According to a preferred solution of the invention, the improvement of the analogue signal focusing is automated through the automatic generation of the emphasizing parameter Vf.

According to a first criterion, the generation of the emphasizing parameter Vf is oriented at reaching a compromise between the signal/noise ratio and the focusing increment needed for obtaining an acceptable digitising.

According to another preferred criterion, the generation of the emphasizing parameter Vf is directed at obtaining a substantially constant focusing (or with limited variation) of the output analogue signal $s_o$, as the focusing of the input analogue signal $s_i$ varies. In this second case, should it be possible to strictly obtain a constant output focusing, as the optical code-reader distance varies, only the amplitude of the analogue signal $s_o$ (unless there is present a very effective automatic control of the gain) and the associated signal/noise ratio vary.

To obtain as output an as constant as possible focusing it is possible to proceed in different ways:

a) by repeatedly scanning the code, each time using a different value of the parameter of emphasizing Vf, into a predetermined interval, so as to have scans of the code with different focusing F, and stopping the selection of Vf at the value corresponding to the output analogue signal having a sufficient focusing for the reader to read correctly; such solution can be easily obtained with the time-discrete diagram of FIG. 11, wherein the digital signals f1 and f2 are varied so as to select all the emphasizing parameters FA (or functions) stared in the memory table 35;

b) by inserting a unit for adjusting the focusing, which localises the code into the scan and provides a measure of the focusing;

c) in real time, by using a signal proportional to the distance between reader and optical code.

Method a) is applicable to low-cost long range COD or CMiS readers (that is, having a high depth of field); method b) is also applicable to long range readers, but with better performance, as well as to mean-level laser scanners. Method c) is applicable, for example, to high-performance laser scanners, and it allows obtaining an automatic control of the focusing in real time.

Figure 15:
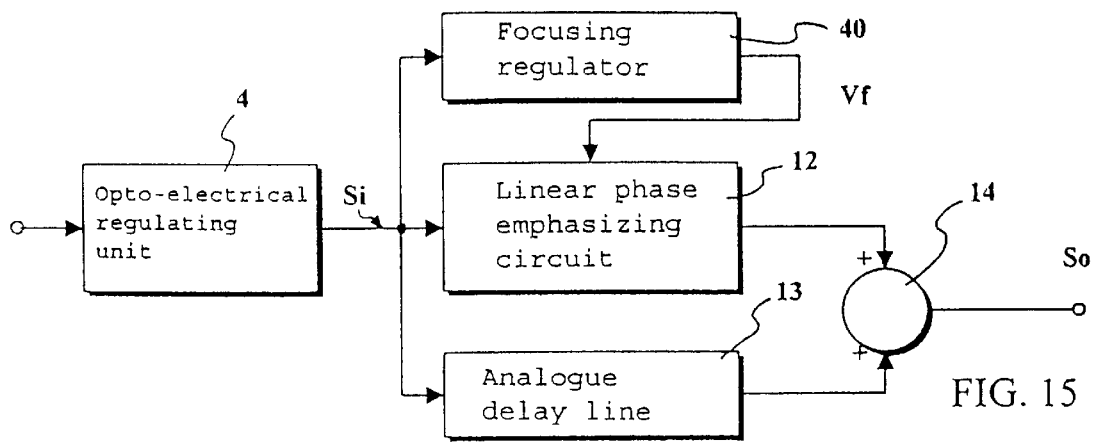
FIG. 15 shows a block diagram of a further embodiment of the invention.
Figure 16:
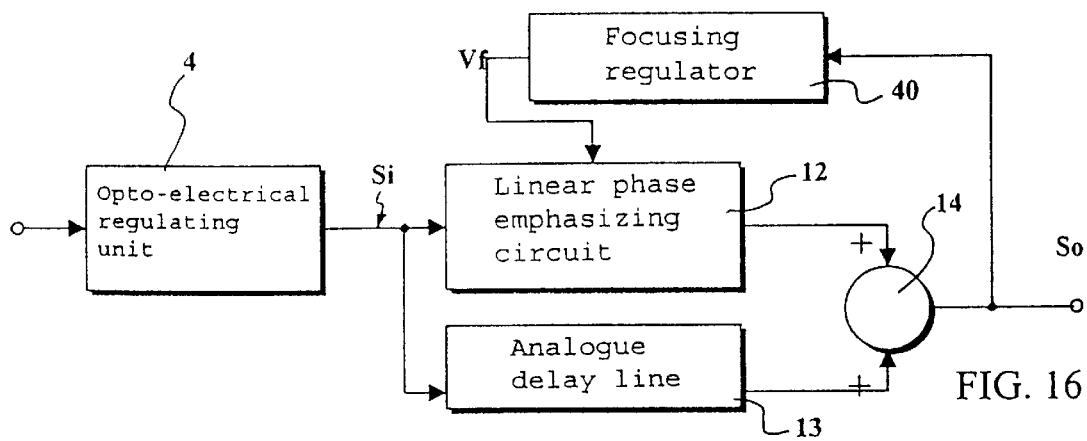
FIG. 16 shows a block diagram of a further embodiment of the invention.

In the case of method b), two different operating modes have been defined according to the invention, in direct action and in feedback, respectively shown in FIGS. 15 and 16.

In particular, in FIG. 15, there is shown a unit 40 for adjusting the focusing, which exhibits an input connected to the output of the opto-electric reception unit 4 and an output providing the emphasizing parameter Vf.

FIG. 16 shows a solution wherein unit 40 for adjusting the focusing exhibits an input connected to the output of node 14 which performs the logical sum function, and an output providing the emphasizing parameter Vf.

Both solutions can also be provided with the linear phase filter 9 downstream of the opto-electric reception unit 4.

The solution of FIG. 16, with feedback control, requires a greater attention for the overall system stability, but it allows having a better result without perfectly knowing the control law (necessary in the solution of FIG. 15) since the unit 40 for adjusting the focusing acts for correcting the signal focusing obtained after the emphasis and for obtaining an optimum focusing for the specific application.

Figure 17:
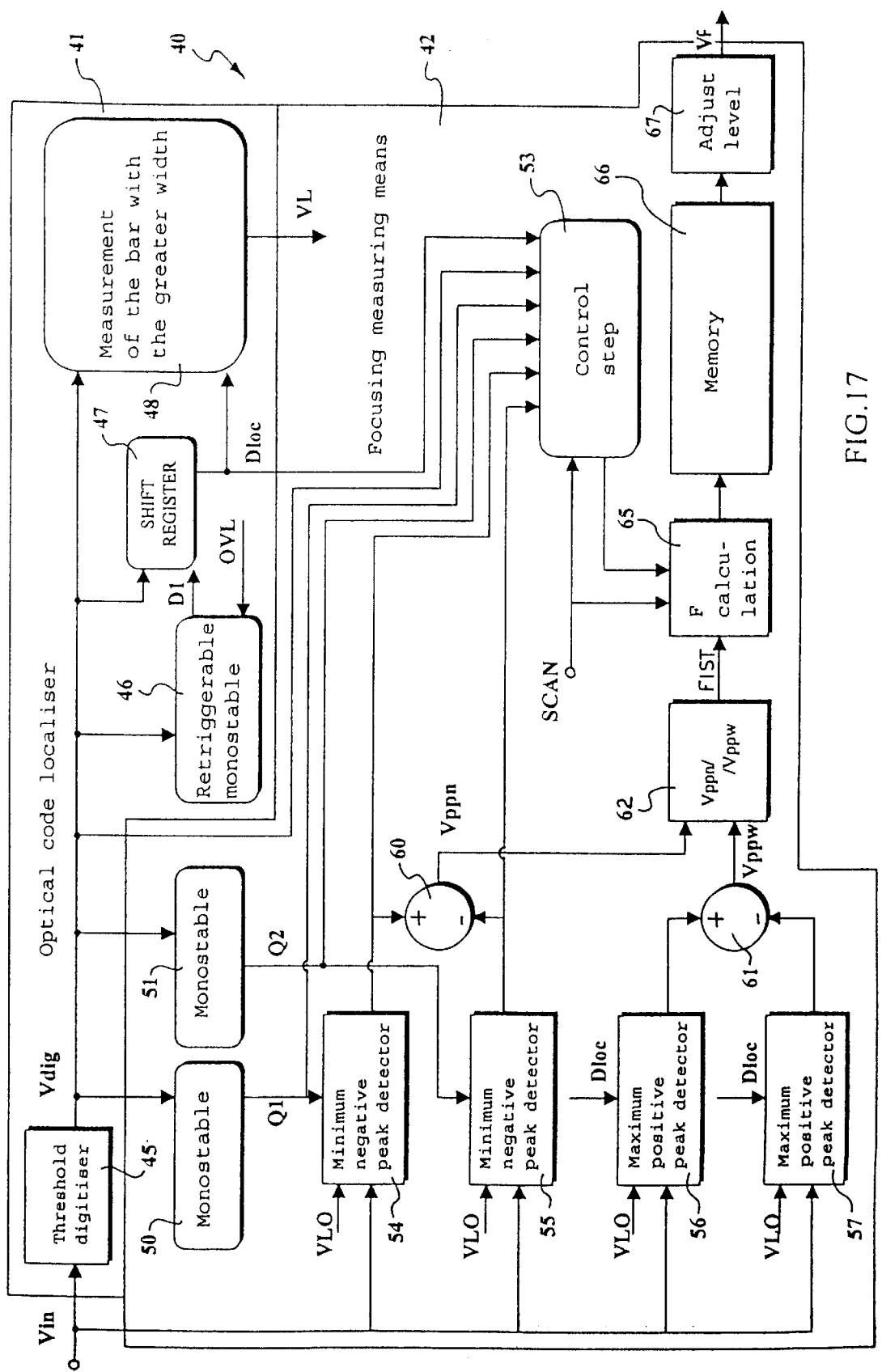
FIG. 17 shows a more detailed diagram of a block of FIGS. 15 and 16.

FIG. 17 shows a block diagram of an embodiment of unit 40 for adjusting the focusing, comprising a section for localising a barcode 41 and a section for measuring the focusing 42.

The section for localising the barcode 41 comprises a threshold digitiser 45 receiving an input signal Vin (consisting of the analogue signals $s_i$ or $s_o$ according to whether unit 40 for adjusting the focusing implements the solution of FIG. 15 or of FIG. 16, or a signal obtained by a preventive processing of such signals, for example a normalisation). The threshold digitiser 45 generates in output a digitised signal Vdig, provided to a retriggerable monostable 46, to a shift register 47, to a measure stage 48, as well as to a first and a second monostable 50, 51, belonging to the measure section of the focusing 42.

The retriggerable monostable 46, moreover, receives in input a width signal VL, generated by the measure stage 48 and relating to the width of the wide elements of the code, and it provides in output a pre-localisation signal D1 to the shift register 47; in turn, the latter generates a digital localisation signal DLOC, provided to the measure stage 48 and to a control stage 53 belonging to the focusing measure section 42.

The focusing measure section 42 comprises four peak detectors 54, 55, 56 and 57, respectively for the minimum positive peak (that is, the peak with minimum amplitude), the minimum negative peak (that is, the valley with minimum amplitude), the maximum positive peak (that is, the peak with maximum amplitude) and the maximum negative peak (that is, the valley with maximum amplitude), all receiving the input signal Vin and the width signal VL. Moreover, the minimum positive peak detector 54 receives the output signal Q1 of the first monostable 50; the minimum negative peak detector 55 receives the output signal Q2 of the second monostable 51; the maximum positive peak 56 and maximum negative peak 57 detectors receive the output signal DLOC of the shift register 47.

Monostable 50 and 51 respectively commute on trailing and leading front of the digitised signal Vdig, so as to suitably enable the peak detectors 54–55.

The output of the minimum positive peak 54 and minimum negative peak 55 detectors is provided to a first subtracting node 60, which calculates the difference defining the peak-valley value of the narrow elements of the code; the output of the maximum positive peak 56 and maximum negative peak 57 detectors is provided to a second subtracting node 61, which calculates the difference defining the peak-valley value of the wide elements of the code. The output of the two subtracting nodes 60, 61 is provided to a dividing block 62 which divides them, calculating the instantaneous focusing value FIST according to (1).

The instantaneous focusing value FIST is provided to a calculation block 65, which calculates the minimum value of FIST in the current scan, under the control of a scan signal SCAN and of the control stage 53 connected to the output of monostable 50, 51, of the shift register 47 and of the minimum positive and negative peak detectors 54, 55. Finally, the focusing value F thus calculated is stored in a memory 66 and provided to a level adjustment circuit 67 which generates in output the emphasizing parameter Vf on the basis of the calculated focusing value F.

In this way, the focusing calculation carried out in the nth scan is used for the automatic correction of the emphasis to be applied on the (n+1)-th scan, through the generated emphasizing parameter Vf.

According to a variant, block 65 calculates the mean value of FIST in the current scan. It is also possible to set a lower limit to the calculated focusing value F if it is deemed that too low values are due to measures having a high error probability, or that they are unimportant for the particular application.

Unit 40 for adjusting the focusing of FIG. 17 operates as follows.

Figure 18A:
FIGS. 18a, 18b and 18c show the pattern of some signals of the diagram of FIG. 17.

The input signal Vin (preferably normalised by a normalisation stage not shown, so as to have an amplitude contained in a predetermined interval and reduced variations of the peak-valley value of the input signal) is transformed by the threshold digitiser 45 into signal Vdig commuting between two different values (reference shall be made to FIG. 18a) and exhibiting positive commutation fronts at the negative fronts of the input signal Vin. The pre-localisation signal D1 in output from the retriggerable monostable 46 commutes to the high stage at any positive front of the digitised signal Vdig and has a duration correlated to the width of the wide code bars, provided through the width signal VL; preferably, the duration of the retriggerable monostable 46 is slightly higher than twice the width of the wide code bars, so that the pre-localisation signal D1 commutes to the high stage at the first bar of the code, and remains high for the entire duration of the code (reference shall be made to FIG. 18b).

Figure 18B:
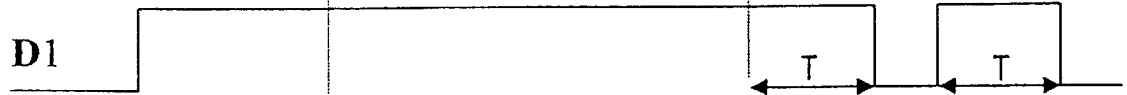
Figure 18C:

However, the pre-localisation signal D1 provides a pulse also in the presence of positive fronts of Vdig, not due to code elements (for example, at the end of the white overflow, due to accidental reflections, etc.), as shown in the right end portion of FIG. 18b. The shift register obviates to such problem by shifting the first commutation front with respect to D1 and generating a high level only in the presence of transitions of signal Vdig into a predetermined interval, as shown in FIG. 18c, in which signal DLOC commutates to the high stage only after having received three pulses of Vdig and in the presence of a high level of D1. In this way, the spurious pulse of D1 on the right does not cause the generation of a corresponding pulse in the localisation signal DLOC.

The measure stage 48 consists of a time-voltage converter and of a circuit storing the maximum voltage level within the localisation window defined by the localisation signal DLOC. Thus, it provides in output the width signal VL used by the retriggerable monostable 46 to set its duration, and by the peak detectors 54, 55, 56 and 57 to deactivate them in the areas of the input signal Vin in which the code is not present.

The maximum peak detectors 56, 57 store in a known way the levels of the peaks associated to the wide elements of the code within the localisation window. This is necessary to prevent errors in the focusing calculation in case of presence of reflections or of very different white overflow levels with respect to the peak values of the signal at the code. The output of the subtracting node 61 provides the peak-valley value Vppw of the sequence of two wide elements. The minimum peak detectors 54, 55 store in a known way the levels of the peaks associated to the narrow elements of the code; then, the output of the subtracting node 62 provides the peak-valley value of the sequence of two narrow elements. Monostable 50 and 51 command the peak detectors 54–55 so that the positive peak detector 54 is in tracking phase when a bar is present in the code and the negative peak detector 55 is in tracking phase when a space is present in the code; in the maintenance phase, the peak 215 detectors 54–55 store the respective maximum detected level.

After calculating the instantaneous focusing FIST and its minimum (or mean) value F (carried out so as to eliminate unimportant values provided by the peak detectors 54–57 and by divider 62), the value just calculated is stored in memory 66.

Unit 40 for adjusting the focusing can also provide, through the control stage 53, for the presence of conditions of validity of the calculation performed, for example by checking that the local contrast exceeds a predetermined threshold.

The advantages obtainable with the described method and device are evident from what said above. In particular, it must be noted that with the present invention it is possible to increase the depth of reading field of the reader, by acting only electronically, but with a similar effect to that obtainable with the mechanical adjustment of the optics.

The focused analogue signal that can be obtained is thus characterised by an extremely limited distortion, and the solutions can be applied to any type of optical code reader having different reflectance with respect to a background. Moreover, the focusing device can be implemented through electrical circuits having well controllable features.

Finally, it is clear that several variants and changes can be made to the described method and device, all falling within the scope of the inventive idea, as defined in the attached claims. For example, the emphasis carried out by the linear phase emphasizing circuit 12' can occur both upstream and downstream of the linear phase high-pass filter, or in any intermediate point of the same high-pass filter (as shown in the example of embodiment of FIG. 10).

According to a variant not shown, rather than with the switched capacitor technology, block 11' of FIG. 12 can be implemented through a program executed by a microprocessor or other logical computation unit. The same is applicable to block 11 of FIG. 10.

In particular, it is possible to use a DSP (Digital Signal Processor) microprocessor, having a clock frequency, for example, of 40–60 MHz.

The DSP contains an ADC (Analogue to Digital Converter), that is, a device that discretises the analogue input signal, transforming it into a discrete-valued and time-discrete signal.

The discrete signal is then digitally processed with an algorithm that performs the same operations performed by the time-discrete circuit of FIG. 12. The focused discrete-valued signal is then reconverted into an analogue signal by a DAC (Digital to Analogue Converter) that can belong to the same DSP.

According to another variant, not shown, unit 40 for adjusting the focusing of FIG. 17 can be implemented through a program executed by a DSP or other logical computation unit. In particular, the analogue input signal Vin (consisting of $s_i$ or $s_o$) is first converted by an ADC (which can belong to the same DSP) into a time-discrete and discrete-valued signal, and then it is processed through an algorithm that detects peaks and valleys of the discrete signal, calculates focusing F and then calculates the emphasizing parameter Vf performing the same logical operations as the circuit of FIG. 17.

What is claimed is:

1. Method for focusing an analogue electrical signal ($s_i$; $s_i(n)$) representative of an optical code and exhibiting frequency band and amplitudes correlated to the information content of the optical code, characterised in that it comprises the steps of selectively emphasizing with linear phase portions of said analogue electrical signal ($s_i$; $s_i(n)$) having predetermined features, and of generating a focused analogue electrical signal ($s_o$; $s_o(n)$).

2. Focusing method according to claim 1, characterised in that the portions with predetermined features of said analogue electrical signal ($s_i$; $s_i(n)$) that are emphasized are those having the highest frequencies in said frequency band.

3. Focusing method according to claim 1, characterised in that said step of emphasizing said analogue electrical signal ($s_i$; $s_i(n)$) comprises a linear phase amplification.

4. Focusing method according to claim 1, characterised in that said step of emphasizing said analogue electrical signal ($s_i$; $s_i(n)$) comprises a linear phase attenuation.

5. Focusing method according to claim 1, characterised in that said step of emphasizing said analogue electrical signal ($s_i$; $s_i(n)$) is associated to a step of filtering with linear phase said analogue electrical signal ($s_i$; $s_i(n)$) or said focused analogue electrical signal ($s_o$; $s_o(n)$), said filtering step being such as to let substantially all the frequencies of said frequency band pass.

6. Focusing method according to claim 5, characterised in that said filtering step is of the low-pass type.

7. Focusing method according to claim 5, characterised in that said filtering step is of the high-pass type.

8. Focusing method according to claim 5, characterised in that said filtering step is of the band-pass type.

9. Focusing method according to claim 2, characterised in that said step of emphasizing said analogue electrical signal ($s_i$; $s_i(n)$) comprises the step of filtering with linear phase said analogue electrical signal ($s_i$; $s_i(n)$) through a high-pass filtering for obtaining an emphasized signal (s1; ef) substantially containing the highest frequencies of said frequency band, the method comprising the further steps of delaying said analogue electrical signal ($s_i$; $s_i(n)$) f or obtaining a delayed signal (s2; $ds_r$) and of summing said emphasized signal (s1; ef) to said delayed signal (s2; $ds_r$).

10. Focusing method according to claim 9, characterised in that the delay introduced in said delaying step is substantially equal to the delay introduced in said emphasizing step.

11. Focusing method according to claim 9, characterised in that said step of emphasizing said analogue electrical signal ($s_i$; $s_i(n)$) is associated to a step of filtering with linear phase said analogue electrical signal ($s_i$; $s_i(n)$) said filtering step being such as to let substantially all the frequencies of said frequency band pass.

12. Focusing method according to claim 11, characterised in that said step of filtering said analogue electrical signal ($s_i$; $s_i(n)$) comprises a pre-emphasizing step.

13. Focusing method according to claim 1, characterised in that it comprises the step of adjusting said focusing through an emphasizing function or parameter (Vf; FA).

14. Focusing method according to claim 13, characterised in that said parameter or said-emphasizing function (Vf; FA) are selected so as to maintain said focusing substantially constant.

15. Focusing method according to claim 13, characterised in that said adjustment step comprises the step of repeatedly scanning said optical code and changing each time said parameter or emphasizing function (Vf; FA) for obtaining different focused analogue electrical signals ($s_o$; $s_o(n)$) and selecting the parameter or emphasizing function (Vf; FA) corresponding to one of said focused analogue electrical signals ($s_o$; $s_o(n)$) having a predetermined focusing.

16. Focusing method according to claim 14, characterised in that it comprises the step of determining the focusing value of at least one between said analogue electrical signal ($s_i$; $s_i(n)$) and said focused analogue electrical signal ($s_o$; $s_o(n)$) and calculating said parameter of emphasizing function (Vf; FA) in function of said focusing value.

17. Focusing method according to claim 16, characterised in that said step of determining said focusing value comprises the steps of determining a minimum peak-valley amplitude (Vppn), of determining a maximum peak-valley amplitude (Vppw) and of dividing said minimum peak-valley amplitude (Vppn) by said maximum peak-valley amplitude (Vppw).

18. Focusing device of an analogue electrical signal ($s_i$; $s_i(n)$) representative of an optical code and exhibiting amplitudes and frequency band correlated to the information content of the optical code, characterised in that it comprises linear phase emphasizing means (7; 8; 12; 12') which selectively emphasize portions of said analogue electrical signal ($s_i$; $s_i(n)$) having predetermined features and generate a focused analogue electrical signal ($s_o$; $s_o(n)$).

19. Focusing device according to claim 18, characterised in that said emphasizing means (7; 8; 12'; 12') emphasizes portions of said analogue electrical signal ($s_i$; $s_i(n)$) having the highest frequencies in said frequency band.

20. Focusing device according to claim 18, characterised in that said emphasizing means (7; 8; 121; 12') comprises a linear phase emphasizing filter (8) which receives said analogue electrical signal ($s_i$; $s_i(n)$) or said focused analogue electrical signal ($s_o$; $s_o(n)$) and lets substantially all the frequencies of said frequency band pass.

21. Focusing device according to claim 20, characterised in that said linear phase emphasizing filter (8) is of the low-pass type.

22. Focusing device according to claim 20, characterised in that said linear phase emphasizing filter (8) is of the high-pass type.

23. Focusing device according to claim 20, characterised in that said linear phase emphasizing filter (8) is of the band-pass type.

24. Focusing device according to claim 19, characterised in that said emphasizing means (12; 12') comprises a high-pass linear phase filter (21a; 21b; 30) and multiplying means (25; 31) which receives said analogue electrical signal ($s_i$; $s_i(n)$) and provides an emphasized signal ($s_i$; ef) substantially containing all the highest frequencies of said frequency band, said focusing device also comprising delay means (13) which receives said analogue electrical signal ($s_i$; $s_i(n)$) and provides a delayed signal (s2; $ds_i$) and summing means (14; 14') which sums said emphasized signal ($s_i$; ef) to said delayed signal (s2; $ds_i$).

25. Focusing device according to claim 24, characterised in that the delay introduced by said delay means (13) is substantially equal to the delay introduced by said emphasizing means (12; 12').

26. Focusing device according to claim 24, characterised in that said high-pass linear phase filter comprises two high-pass filters (21a; 21b) in cascade.

27. Focusing device according to claim 24, characterised in that said high-pass linear phase filter is a linear phase FIR filter (30).

28. Focusing device according to claim 24, characterised in that said delay means (13) comprises four all-pass filters (21) in cascade.

29. Focusing device according to claim 24, characterised in that upstream of said emphasizing means (12; 12') and of said delay means (13) it comprises a low-pass linear phase filter (9) which receives said analogue electrical signal (s2; $s_i(n)$) and lets substantially all the frequencies of said frequency band pass.

30. Focusing device according to claim 29, characterised in that said low-pass linear phase filter (9) comprises an emphasizing circuit.

31. Focusing device according to claim 24, characterised in that said multiplying means (25; 31) comprises an amplifier with controllable gain through a parameter or an emphasizing function (Vf; FA).

32. Focusing device according to claim 31, characterised in that di it comprises means (40) for adjusting the focusing comprising calculation means (54–57; 60–62; 65; 67) that determines the focusing value of at least one between said analogue electrical signal ($s_i$; $s_i(n)$) and said focused analogue electrical signal ($s_o$; $s_o(n)$) and calculates said parameter or emphasizing function (Vf; FA) on the basis of said focusing value.

33. Focusing device according to claim 32, characterised in that said calculation means (54–57; 60–62; 65; 67) comprises a minimum positive peak detector (54), a minimum negative peak detector (55), a maximum positive peak detector (56) a maximum negative peak detector (57), a first subtracting element (60) connected to said minimum positive peak and minimum negative peak detectors (54, 55) which provides a minimum peak-valley amplitude (Vppn), a second subtracting element (61) connected to said maximum positive peak (56) and maximum negative peak (57) detectors, which provides a maximum peak-valley amplitude (Vppw) and a divider (62) connected to said first and second subtracting element (60, 61), which divides said minimum peak-valley amplitude (Vppn) by said maximum peak-valley amplitude (Vppw).

\* \* \* \* \*